(12) United States Patent
Brundage

(10) Patent No.: US 8,152,590 B2
(45) Date of Patent: Apr. 10, 2012

(54) ACOUSTIC SENSOR FOR BEEHIVE MONITORING

(76) Inventor: Trenton J. Brundage, Sherwood, OR (US)

( * ) Notice: Subject to any disclaimer, the term of this patent is extended or adjusted under 35 U.S.C. 154(b) by 405 days.

(21) Appl. No.: 12/553,853

(22) Filed: Sep. 3, 2009

(65) Prior Publication Data

US 2010/0062683 A1 Mar. 11, 2010

Related U.S. Application Data

(60) Provisional application No. 61/191,015, filed on Sep. 5, 2008.

(51) Int. Cl.
*A01K 47/06* (2006.01)
(52) U.S. Cl. .................................. 449/2; 449/3
(58) Field of Classification Search .................. 449/1, 2, 449/3, 20
See application file for complete search history.

(56) References Cited

U.S. PATENT DOCUMENTS

| 2,806,082 A * | 9/1957 | Woods ............................. 73/648 |
| 6,910,941 B2 * | 6/2005 | Bromenshenk et al. ........... 449/3 |
| 7,549,907 B2 * | 6/2009 | Bromenshenk et al. ........... 449/2 |

FOREIGN PATENT DOCUMENTS

| RU | 2 096 952 C1 * | 11/1997 |
| RU | 2 118 084 C1 * | 8/1998 |

* cited by examiner

*Primary Examiner* — Rob Swiatek
(74) *Attorney, Agent, or Firm* — Stoel Rives LLP

(57) ABSTRACT

A method of and system for using sounds produced by bees flying near a beehive entrance enable a beekeeper to assess the operational productivity of the beehive. In a preferred embodiment, the method entails positioning an acoustic pickup device, such as a microphone, at a location to pick up and provide an audio signal representing sounds produced by bees flying around the beehive entrance. The flying bees produce the sounds either while hovering in the vicinity of the beehive or while launching from locations around the beehive entrance to forage for pollen and nectar. The audio signal is analyzed to distinguish the sound of launching flying bees from the sound of ambient background noise.

18 Claims, 11 Drawing Sheets

ACOUSTIC SENSOR FOR BEEHIVE MONITORING

RELATED APPLICATION

This application claims benefit of U.S. Provisional Patent Application No. 61/191,015, filed Sep. 5, 2008.

COPYRIGHT Notice

© 2009 Trenton J. Brundage. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present disclosure relates to a method of monitoring beehive activity, and in particular, a method of assessing the operational productivity of a beehive using sounds produced by bees flying near the beehive entrance.

BACKGROUND INFORMATION

Honeybees are critical for the pollination of many crops, especially those that bloom early in the year when populations of natural pollinators are low. Beekeepers rent beehives to farmers for pollination services. Typically, a commercial beekeeper rents beehives to a farmer while crops such as pumpkins, apples, and almonds are in bloom. Beehives are placed in fields or orchards at a density to provide a sufficient number of bees to pollinate all of the blossoms. The pollination success is dependent on the activity of the bees. In rainy or cold weather the bees may not leave the beehive to forage for pollen and nectar, leading to poor pollination of the farmer's crop. Too few bees in the beehives, unhealthy bees, and bees with weak foraging instincts caused by inferior genetic characteristics can also lead to poor pollination performance.

Bees are also used to produce honey. Honey starts out as nectar that bees collect from local plants and flowers. The bees collect nectar by storing it in their honey stomachs and carrying the nectar in 40 mg loads back to the beehive. The foraging bees regurgitate the nectar and pass it to worker bees in the beehive. These bees then gradually transform the nectar into honey by evaporating most of the water from it. During a nectar flow, bees will typically store the honey above the brood nest, so a beekeeper places honey supers on top of the beehive for the bees to fill with nectar. When the nectar reaches a moisture content of about 17%, the bees will cap the cells with wax. The honey is then ready to be harvested by the beekeeper. Honey production is also dependent on the activity of the bees. Bad weather, unhealthy bees, and bees with poor foraging instincts can all lead to low honey yields.

Monitoring the health and activity of bees is a time consuming and difficult job for a beekeeper with many beehives. A beekeeper typically monitors the health and activity of a colony by observing the honeybees around the beehive and visually inspecting the beehive frames for quantities of brood, pollen and nectar, and presence of disease and pests. Based on data collected during the inspection, the beekeeper plans a course of action for the beehive such as feeding the bees, splitting a colony, installing a new queen, and medicating the colony. Frequent inspections are critical for detection and prevention of pests and diseases such as mites, viruses, and bacterial infections. Beehive inspection and maintenance are labor intensive and limit the number of beehives a beekeeper can maintain.

Further complicating the monitoring and maintenance of beehives for the beekeeper is the fact that groups of beehives are often placed in different locations. Depending on the pollen and nectar sources in a given area, there is a maximum number of beehives that can be placed in one apiary. Too many beehives placed in one apiary result in competition for scarce resources. A good rule of thumb is to have no more than 25-40 beehives in a permanent apiary.

SUMMARY OF THE DISCLOSURE

A method of using sounds produced by bees flying near a beehive entrance enables a beekeeper to assess the operational productivity of the beehive. In a preferred embodiment, the method entails positioning an acoustic pickup device (such as a microphone) at a location to pick up and provide an audio signal representing sounds produced by bees flying around the beehive entrance. The flying bees produce the sounds either while hovering in the vicinity of the beehive or while launching from locations around the beehive entrance to forage for pollen and nectar. The audio signal is analyzed to distinguish the sound of launching flying bees from the sound of ambient background noise.

Analysis of the audio signal includes creating a frequency content representation of the audio signal to identify an acoustic signature associated with the flying bees. The flying bees' beating wings produce the acoustic signature that has a fundamental frequency and associated harmonic frequencies. The fundamental frequency is in a range from about 180 Hz to about 260 Hz. The presence of a downward frequency shift in the fundamental frequency corresponds to a flying bee launching from locations around the beehive entrance. The frequency difference between two adjacent harmonic frequencies corresponds to the fundamental frequency; therefore, any frequency shift in the fundamental frequency is detectable by monitoring a corresponding change in the frequency difference between adjacent harmonic frequencies. The downward frequency shift is used to provide an indication of the flying bee launching from locations around the beehive entrance.

The number of indications of the flying bees launching from locations around the beehive entrance is counted during multiple predetermined temporally spaced apart periods. The number is then used to produce bee sortie data. The bee sortie data are processed to determine whether over time the numbers of flying bees launching from locations around the beehive entrance during the predetermined periods fall outside of an operational tolerance.

A beekeeper or farmer monitoring and recording the bee sortie data can determine the operational productivity of the beehive. Depending on the location of and the desired purpose for deploying a beehive, the operational productivity can include estimates of the health, honey production, and the pollination performance of the beehive. In one implementation of the preferred embodiment described, monitoring the operational productivity can be accomplished by retrieval of the bee sortie data by user observation of an LCD or by use of a computer wirelessly linked to the acoustic sensors via preferred wireless protocols.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
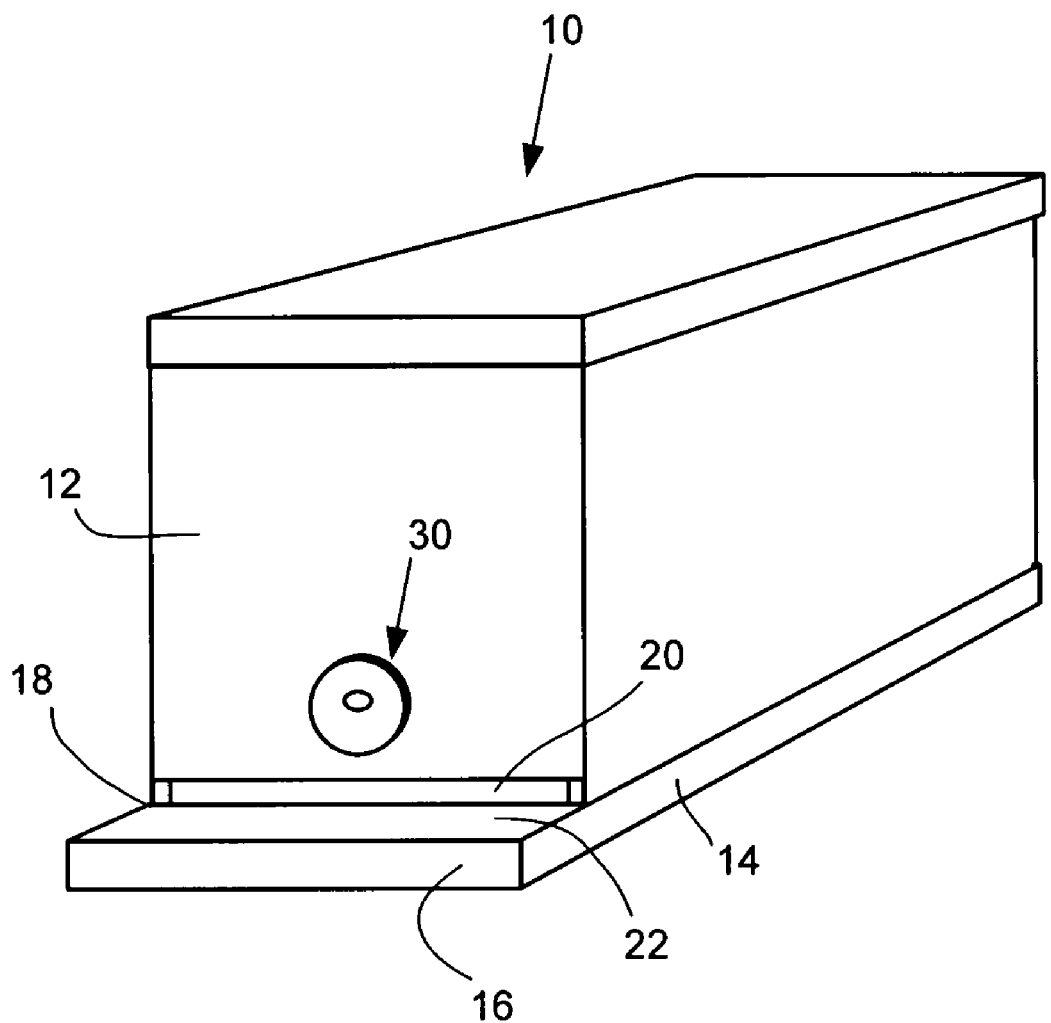
FIG. 1 is an isometric view of a beehive and a preferred embodiment of a beehive monitoring device placed near an entrance of the beehive.

FIG. 1 shows a portable beehive 10 that is specifically designed for beekeeping and houses a population of domesticated honeybees. Beehive 10 is an enclosed, boxed-like structure composed of a front panel 12 and a base 14 having a ledge 16 that projects outwardly from a bottom side margin 18 of front panel 12. A narrow slot 20 extending along bottom side margin 18 and an upper surface 22 of ledge 16 forms an entrance to beehive 10. Beehive 10 is sized to facilitate transportation between an apiary and a field during a crop bloom.

Worker bees populating beehive 10 principally use entrance 20 when leaving and returning from foraging round trips (sorties); however, the bees populating beehive 10 also use entrance 20 for other various activities. For example, idle worker bees congregate at entrance 20 to protect beehive 10 from intruders as well as to regulate the temperature of beehive 10. Younger worker bees use entrance 20 while refining flying and hovering skills in preparation for future sorties. Drone bees and younger queen bees use entrance 20 while leaving beehive 10 to find new reproductive partners. These various activities occurring in the vicinity of entrance 20, as well as various activities occurring inside beehive 10, create a characteristic ambient beehive noise. The ambient beehive noise is combined with ambient environmental noise as well as a noise floor. The combination is collectively defined as ambient background noise.

In a preferred embodiment, an acoustic sensor 30 is located near entrance 20 of beehive 10. Acoustic sensor 30 is preferably mounted on front panel 12 at a location that is a short distance above and midway along the length of entrance 20. Acoustic sensor 30 includes an acoustic pickup device or microphone 32 (FIG. 2) that picks up and provides an audio signal representing sounds produced by bees flying near entrance 20. Acoustic sensor 30 distinguishes from ambient background noise the sounds of bees launching from locations around entrance 20 to generate bee sortie data. The bee sortie data include a count of the bee launches as evidence of the number of foraging sorties the bees fly during a given period. In another embodiment, the bee sortie data include the average wing beating frequency (or wing rate) of the launches.

Figure 2:
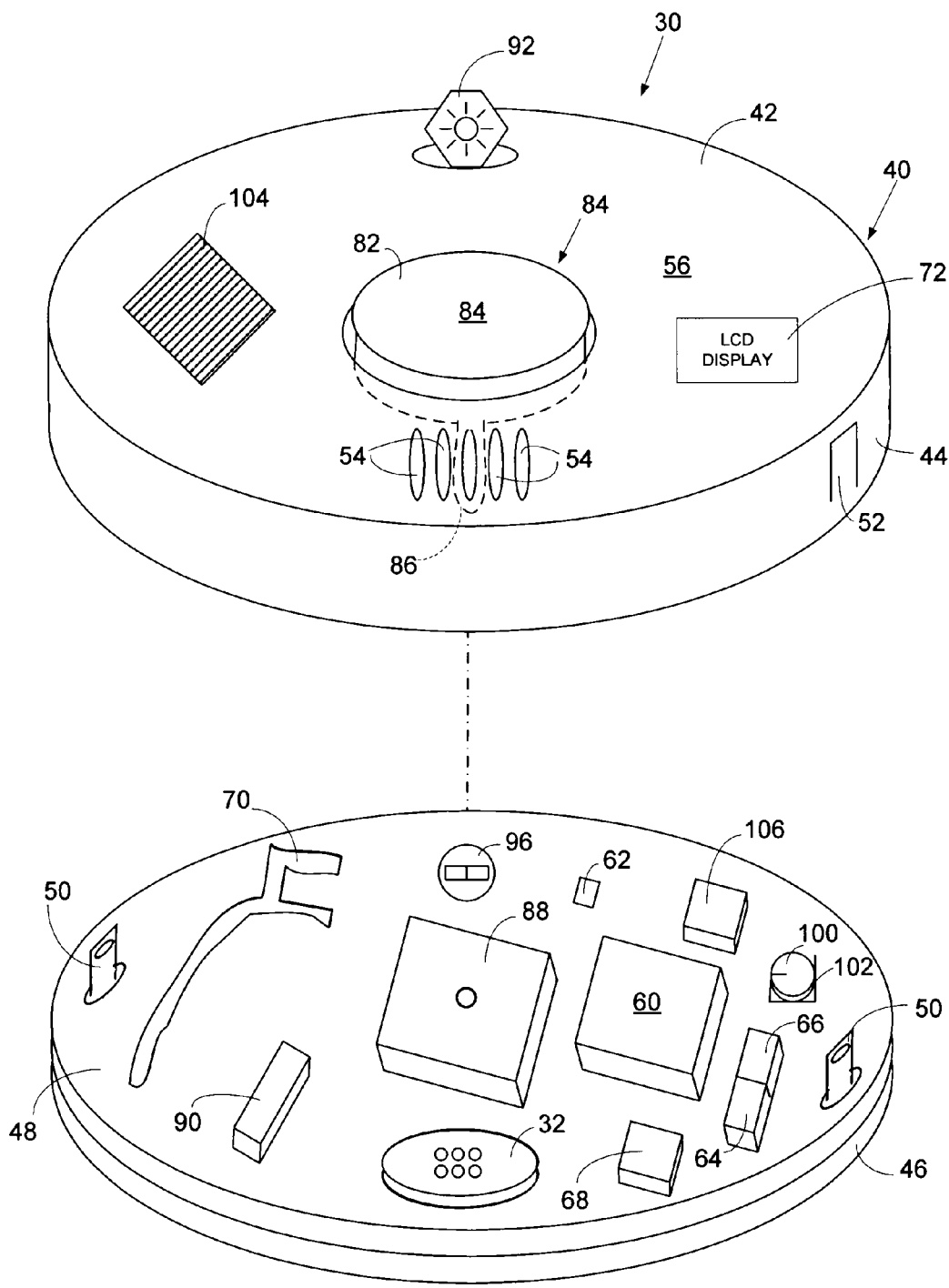
FIG. 2 is a partly exploded, enlarged isometric view of the acoustic sensor of FIG. 1, showing the outer housing and circuit board assembly components.

FIG. 2 shows in greater detail the components of a preferred embodiment of acoustic sensor 30. With reference to FIG. 2, acoustic sensor 30 includes a housing 40 made from weather resistant plastic. Housing 40 includes a shallow cylindrical cover portion 42 having a downwardly depending circular side wall 44 that is sized to cover and enclose a base portion 46 supporting a printed circuit board 48. Opposing prongs 50 extending upwardly from base portion 46 and through printed circuit board 48 mate with spatially aligned opposing relief tabs 52 (only one shown) in side wall 44 to provide a snap fit when housing 40 is assembled. Cover portion 42 and base portion 46 are secured together to protect from weather damage electronic components mounted to printed circuit board 48. Acoustic pickup device 32 is mounted to printed circuit board 48 and positioned in spatial alignment with vent slits 54 formed in a top surface 56 of cover portion 42. This arrangement allows sound to pass through vent slits 54 and into acoustic pickup device 32, which converts sound into an audio signal.

Acoustic pickup device 32 conveys the audio signal by electrical wire connection to a processor 60 that receives a clock signal from a crystal oscillator 62 and manipulates data stored in random access memory 64 and flash memory 66. Acoustic pickup device 32 is preferably a microphone capable of digitally sampling sounds, thereby creating digital acoustic time-series data. Alternatively, the audio signal may be digitized by an analog-to-digital converter integrated into processor 60 or in a standalone analog-to-digital converter microchip (not shown). A suitable acoustic pickup device 32 is a Model MB6022APC-0, manufactured by Knowles Acoustics, Itasca, Ill.

A temperature sensor 68 mounted to printed circuit board 48 converts ambient environmental temperatures into a temperature signal and conveys it to processor 60 by electrical wire connection. The temperature signal is preferably digitized by an analog-to-digital converter integrated into processor 60 or alternatively is digitized in a standalone analog-to-digital converter microchip (not shown).

In a preferred embodiment, bee sortie data produced by multiple acoustic sensors 30 are transmitted wirelessly to a computer (referred to as a "coordinator") (not shown) that is located nearby their associated beehives 10. The coordinator stores data received from acoustic sensors 30 and uses software to compute summary statistics of the bee sortie data. Summary statistics are useful for sending data to remote computers over limited bandwidth cellular data links. The coordinator includes a GPS receiver for conveying GPS coordinates along with data from acoustic sensors 30 to a remote computer via a cellular or satellite modem. One preferred wireless protocol between the coordinator and acoustic sensors 30 is IEEE 802.15.4 (ZigBee). Processor 60 is preferably a Freescale ARM microcontroller with an integrated ZigBee IEEE 802.15.4 wireless transceiver. An antenna 70 formed on printed circuit board 48 is electrically connected to processor 60 and provides a low cost internal antenna for IEEE 802.15.4 antenna signals. As an alternative, acoustic sensor 30 may use other standard wireless protocols such as WiFi IEEE 802.11 or Bluetooth IEEE 802.15.1.

In another embodiment, bee sortie data are presented on an LCD 72 integrated into acoustic sensor 30 and located on housing 40 for viewing by a beekeeper or farmer. Alternatively, LCD 72 is connected to acoustic sensor 30 using a standard wired connection. Stationary and launching bee counts, wing rates, and derived quantities such as the number of bees launching each hour are displayed on a simple graphic or character LCD screen.

A tactile momentary-on push button assembly 80 provides a user input signal to processor 60. Button assembly 80 includes a button actuator 82 having a button surface 84 that is generally flush with top surface 56 of cover portion 42. A center post 86 downwardly depends from button actuator 82 and is spatially aligned with a momentary-on push button 88 that is mounted to printed circuit board 48. Button actuator 82 is preferably made of plastic or weather-resistant rubber to provide a seal in the seam between button actuator 82 and cover portion 42. When a user places a finger on button surface 84 of button actuator 82, center post 86 mechanically transfers the button press force to tactile momentary-on push button 88. A beekeeper presses button actuator 82 one or more consecutive times after inspecting, relocating, medicating, or requeening beehive 10. The number of button presses performed within a fixed time window provides a signal to processor 60 to log a specific event associated with the number of button presses. Different numbers of button presses in a fixed time window denote different types of events. For example, processor 60 is preferably programmed to log one button press to indicate a simple inspection, two button presses to indicate application of medicines, and so on. The definitions for button presses are preset in firmware executing on processor 60, or alternatively, the definitions are preset in software running on a remote computer.

A log of all events is preferably stored in flash memory 66 to provide an electronic record that stays with beehive 10. Alternatively, the log or individual events are automatically wirelessly uploaded to a remote computer via antenna 70 and no storage takes place at the beehive 10.

In addition to manual button presses, acoustic sensor 30 has an ability to receive input signals from a laptop, personal digital assistant, or other wireless device. A beekeeper applies input signals to record notes about the condition and performance of beehive 10 as the beekeeper performs manual inspections and maintenance on beehive 10. For example, the beekeeper may record notes about the condition of beehive 10 on inspection days. The notes preferably include specific parasitic mite counts or dates when beehive 10 was last medicated or requeened. The notes are then downloaded from the wireless device to flash memory 66 via a wireless link. In this embodiment, the beekeeper stores the maintenance records for each beehive 10 along with the bee sortie data collected by its associated acoustic sensor 30. The notes establish a maintenance record that is uploaded from acoustic sensor 30 to a remote computer (or coordinator) via a wireless link.

An amplifier 90 increases the magnitude of any one of the signals produced by temperature sensor 68, antenna 70, or acoustic pick-up device 32 when the signal is too small to be detected by processor 60 input ports. The signals are amplified and then conveyed to processor 60 input ports. Amplifier 90 is also beneficial for driving a status indicator 92 positioned on cover portion 42 in the event that processor 60 has insufficient output power at its output ports to directly drive status indicator 92. Status indicator 92 is preferably an LED or alternatively a lens for passing light propagating through top surface 56 from a surface mount LED 96 on printed circuit board 48.

In a preferred embodiment, acoustic sensor 30 is powered by a battery 100 that is seated in a retaining clip 102 electrically connected to printed circuit board 48. Alternatively, side wall 44 or top surface 56 also include a solar cell 104 for charging battery 100. The power from the battery is regulated by a buck converter 106 mounted to printed circuit board 48.

To conserve power, processor 60 is put into sleep mode when temperature sensor 68 indicates that it is too cold for bees to fly. In an alternative power management scheme, processor 60 is put into sleep mode when light sensors (not shown) indicate to processor 60 the state of nighttime hour conditions. In another power management embodiment, processor 60 regularly cycles in and out of sleep mode for fixed time windows including one minute awake followed by two or more hours asleep to substantially reduce power consumption.

Figure 3A:
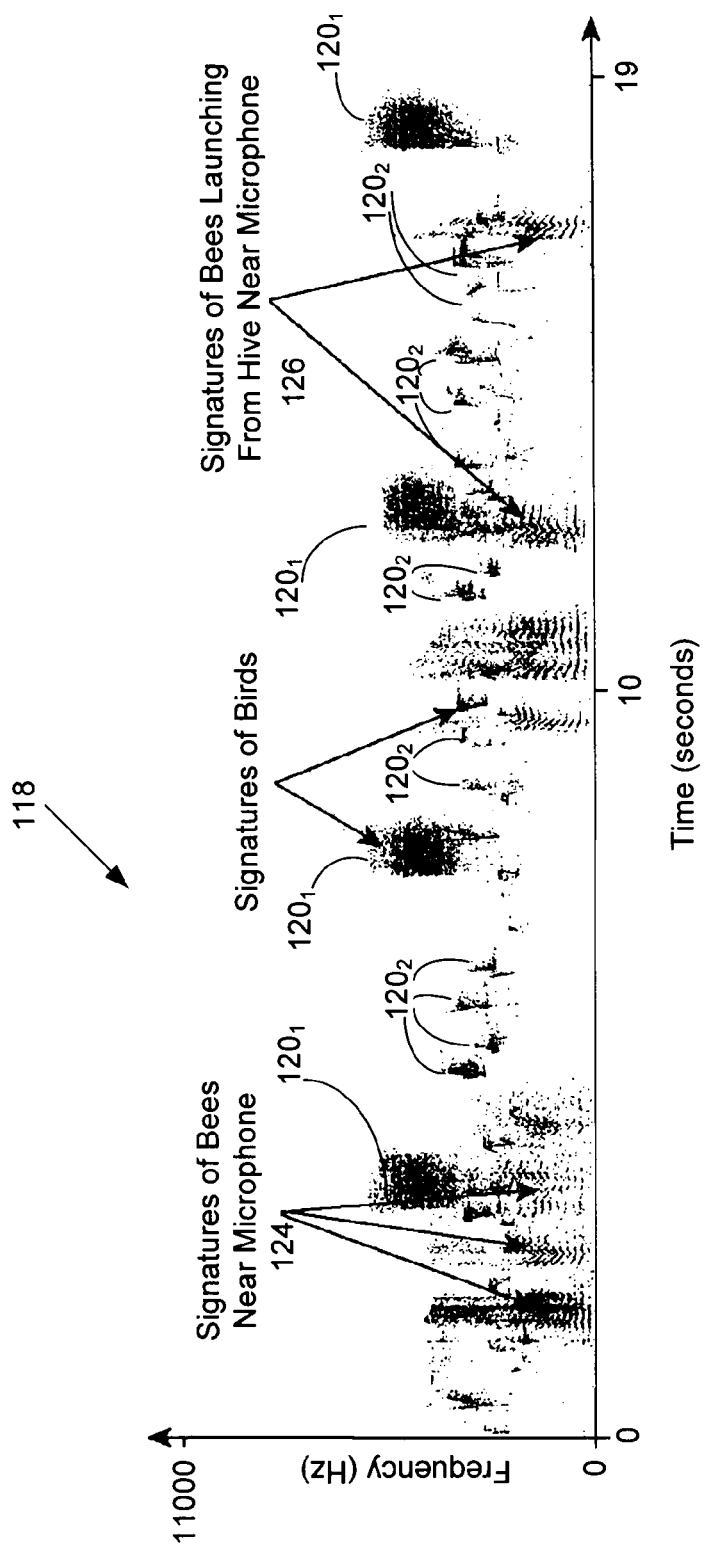
FIG. 3A shows a spectrogram exhibiting acoustic signatures of bees with ambient background noise.

FIG. 3A shows a spectrogram 118 of an audio recording taken over an 18-second period near entrance 20 of beehive 10 on a warm, sunny day. The y-axis of spectrogram 118 corresponds to the audio signal frequency in Hertz (Hz), and the x-axis corresponds to time in seconds. A spectrogram is a plot of the power in the frequency content of the audio signal as it changes over time. The noise floor that results from electrical cross-talk interference and the DC offsets that result from acoustic pick-up device 32 and associated electrical connections have been pre-filtered in FIGS. 3A and 3B to better illustrate the lower frequency content. A spectrogram of the type disclosed is generated in four steps. First, an acoustic signal is digitally sampled in the time domain. Second, the samples are divided into discrete time slices that slightly overlap. Third, a Discrete Fourier Transform is performed on each time slice to calculate the magnitude of the frequency spectrum for each time slice and thereby form spectral frames of data. Finally, the spectral frames of data are plotted side by side on the x-axis to form the spectrogram.

With reference to FIG. 3A, spectrogram 118 reveals several audio signal sources. An intermittent ambient environmental noise originated from two distinct types of birdcalls. A first type of birdcall $120_1$ appeared on four separate occasions and is depicted as a wide-bandwidth, longer duration, higher frequency birdcall. A second type of birdcall $120_2$ occurred roughly three times as often as first birdcall $120_1$ and is depicted as a narrow bandwidth, shorter-duration, lower frequency chirp.

Ambient beehive noise 124 created by several bees outside beehive 10 is characterized by roughly equally spaced apart wavy lines that correspond to lower frequency harmonics and form a distinctive acoustic signature whenever a bee flaps its wings. In a preferred embodiment, the presence of the first six or seven frequency harmonics is sufficient to detect an acoustic signature of a bee; therefore, the highest frequency content required to detect the acoustic signature is approximately 2,000 Hz. A sample rate of 4,000 samples per second is preferred to satisfy the Nyquist sampling criterion for this frequency range. At this sample rate, a commercially available conventional processor 60 can readily perform a Discrete Fourier Transform in near real time and with little latency. Based on the detection of an acoustic signature of a bee enables detection of a bee launch 126, as indicated in FIG. 3A and described in detail with reference to FIG. 3B.

Figure 3B:
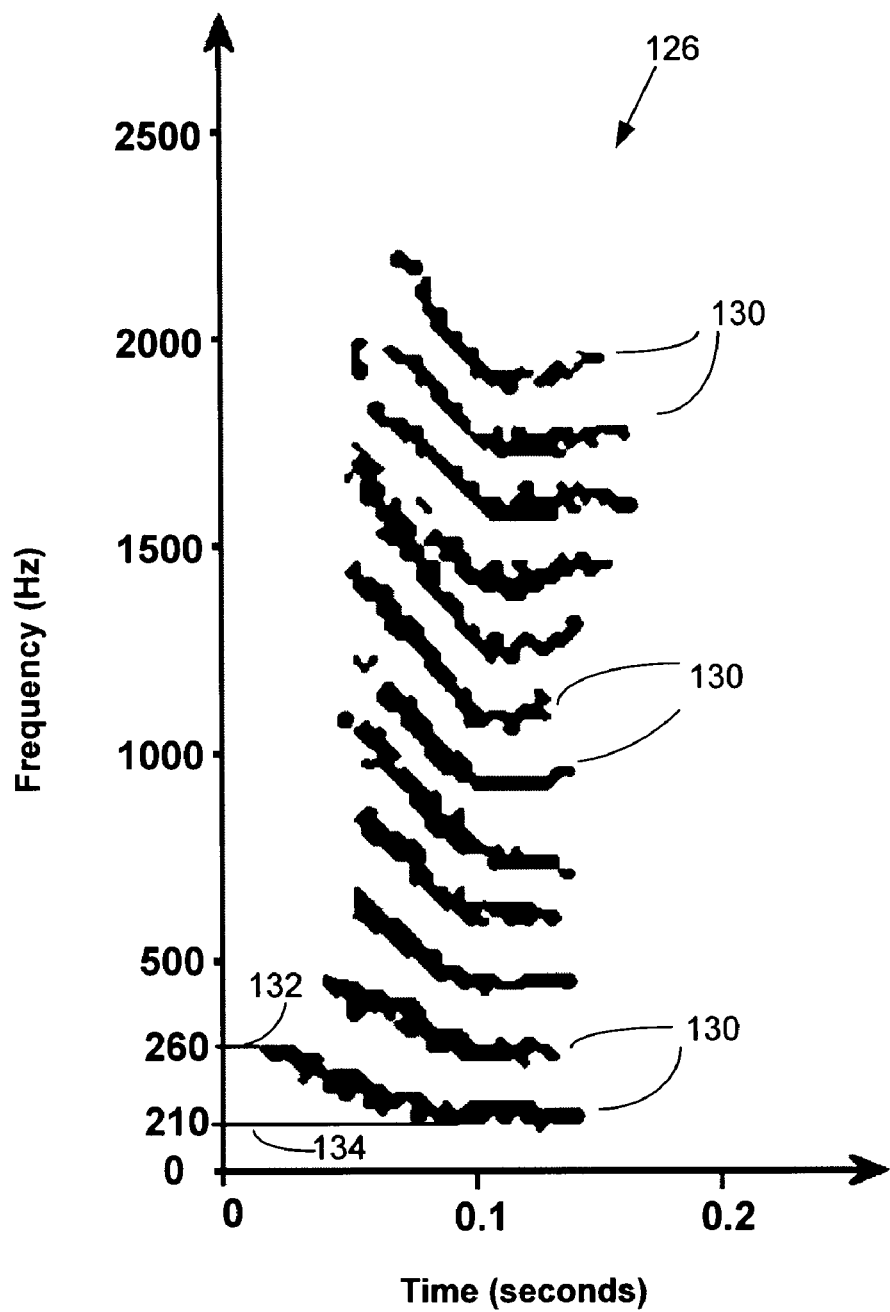
FIG. 3B shows detailed acoustic signature of bee launch 126 included in the spectrogram of FIG. 3A.

FIG. 3B shows a spectrogram frame illustrating the acoustic signature of a bee launch 126 from a location around beehive entrance 20. As discussed above, an acoustic signature of a bee is depicted in a spectrogram as a group of roughly equally spaced apart wavy lines 130, each of which representing decreasing frequency with time. The lowest frequency line 130 of this group corresponds to the fundamental frequency at which the wings of the bee are beating. Successive lines 130 correspond to the harmonics of this fundamental frequency. The distance on the y-axis between next adjacent lines 130 represents the fundamental frequency; therefore, a wing rate of a bee at a given time can be computed by measuring the distance between any two next adjacent lines 130 in spectrogram 118.

During a launch event, a bee initially beats her wings at a maximum wing rate value. Once airborne, the bee beats her wings at a progressively reduced wing rate to a steady state value, at which time the bee leaves the sound capture range of acoustic sensor 30. This process is exhibited in FIG. 3B. Whenever a bee launches from beehive 10, a distinctive frequency shift from higher frequency to lower frequency is characterized by the negatively sloped, roughly equally spaced wavy lines 130. The negative slope indicates that the fundamental frequency and its harmonics are decreasing in frequency. With respect to FIG. 3B, an initial fundamental frequency 132 is 260 Hz, meaning the wings of the bee are beating at a maximum value of about 260 times per second. (A launching bee wing rate as low as about 230 Hz has been observed.) A tenth of a second later, the observed fundamental frequency 134 decreases to a steady state value of about 210 Hz, as a result of a combination of changing air speed and the decreasing rate at which the bee beats her wings. (A steady state bee wing beat rate as low as about 180 Hz has been observed.) A downward frequency shift is observable whenever a bee launches from beehive 10 to gather nectar or pollen and is not observable in ambient background noise or when idle bees hover or congregate at beehive entrance 20. Consequently, the downward frequency shift between the maximum and steady state values can be used to distinguish the sounds of a flying bee launching from beehive 10. This downward frequency shift makes possible counting honeybee sorties with use of acoustic sensor 30.

Figure 4:
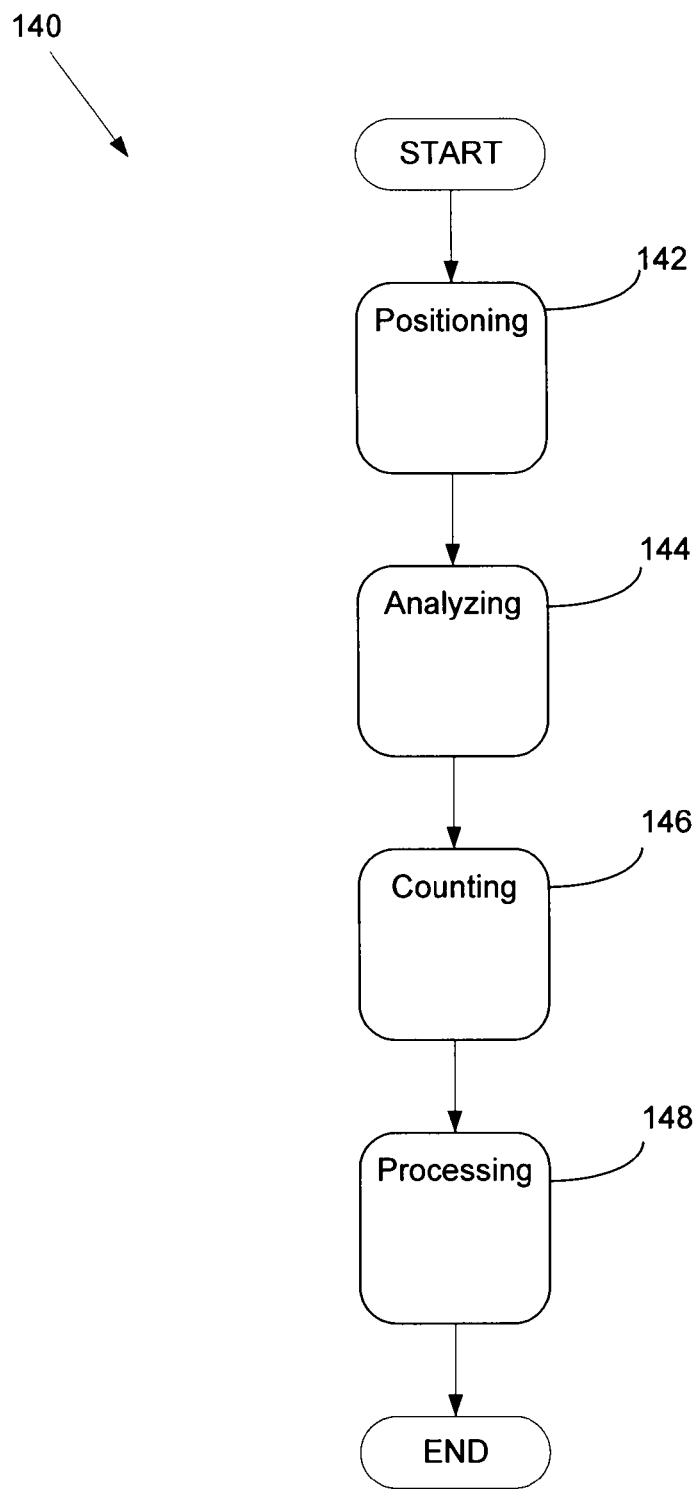
FIG. 4 is a simplified flow diagram of a method of using sounds produced by bees flying near a beehive entrance to assess the operational productivity of the beehive.

FIG. 4 is a flow diagram of the steps of a method 140 that uses sounds produced by bees flying near entrance 20 to assess the operational productivity of beehive 10. A first step 142 of method 140 entails positioning of an acoustic pickup device 32 at a location to pick up and provide an audio signal representing sounds produced by bees flying near beehive entrance 20. Method step 144 entails analyzing the audio signal to distinguish ambient background noise from sounds representing flying bees launching from locations around beehive entrance 20 and to provide indications of flying bee launches. Method step 146 entails counting for each of multiple predetermined temporally spaced apart periods and in response to the flying bee launch indications a number of the flying bees launching from locations around beehive entrance 20 to produce bee sortie data. Method step 148 entails processing the bee sortie data to determine whether over time the numbers of flying bees launching from locations around beehive entrance 20 during the predetermined periods fall outside of an operational tolerance and thereby provide an indication of the operational productivity of beehive 10.

Figure 5:
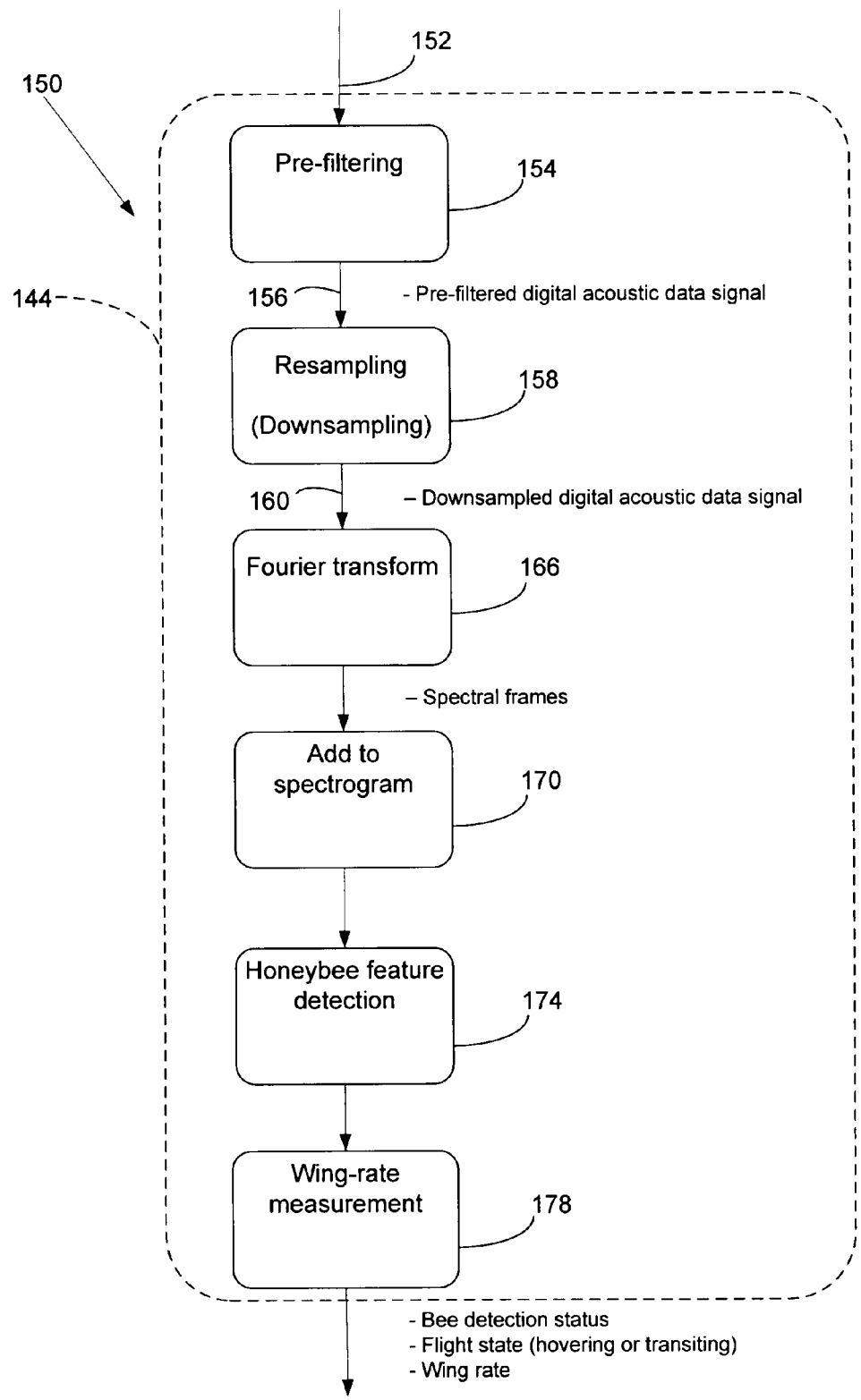
FIG. 5 is a detailed flow diagram showing a preferred implementation of the audio signal analysis step of the flow diagram of FIG. 4 performed to distinguish sounds representing flying bees launching from locations around a beehive entrance from ambient background noise.

FIG. 5 is a detailed flow chart diagram showing a preferred embodiment 150 of implementing of step 144 of method 140. With reference to FIG. 5, preferred embodiment 150 analyzes an audio signal to distinguish sounds representing flying bees launching from locations around a beehive 10 entrance 20 from ambient background noise. Preferred embodiment 150 begins with an acoustic signal, preferably a raw digital acoustic data signal 152. Step 154 entails prefiltering raw digital acoustic signal 152 to remove from it spurious noise spikes generated by acoustic pickup device or microphone 32, and thereby produce a prefiltered digital acoustic signal 156. Prefiltering is not required but implements a best practices approach to mitigate effects of poor quality microphones.

Figure 6:
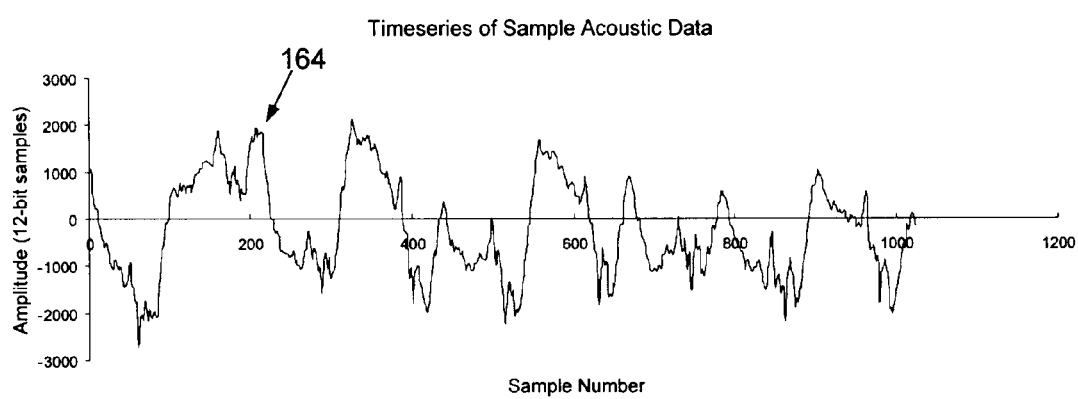
FIG. 6 is a waveform representing an example of one frame of a time series of sample acoustic data of a raw digital acoustic data signal.

To accommodate the proper frequency range of human-perceptible sound, processor 60 samples acoustic signals at relatively high sample rates. As discussed with reference to FIG. 3A, detecting an acoustic signature of a bee requires a sample rate of only 4,000 samples per second. Step 158 entails downsampling prefiltered digital acoustic signal 156 to reduce the number of samples of the raw digital acoustic data to produce a downsampled digital acoustic data signal 160. Nevertheless, a higher sample count provides a higher resolution frequency content spectrum, and thus for demonstrating the later steps of method 150, a higher sample count is preferred. FIG. 6 shows a waveform 164 representing an example of a time series of sample acoustic data of raw digital acoustic data signal 152. With reference to FIG. 6, a raw digital acoustic signal 152 is sampled at 22,050 samples per second, and the samples are stored in a frame buffer. Each frame of raw audio data is composed of 1,024 time-series data samples, which correspond to about 0.046 second of data at the 22,050 samples per second rate. In this example, successive frames overlap by 768 samples (i.e., 75% overlap). An overlap of this size means that the oldest 256 samples are moved out of the frame buffer and 256 new samples are moved into the frame buffer.

Figure 7:
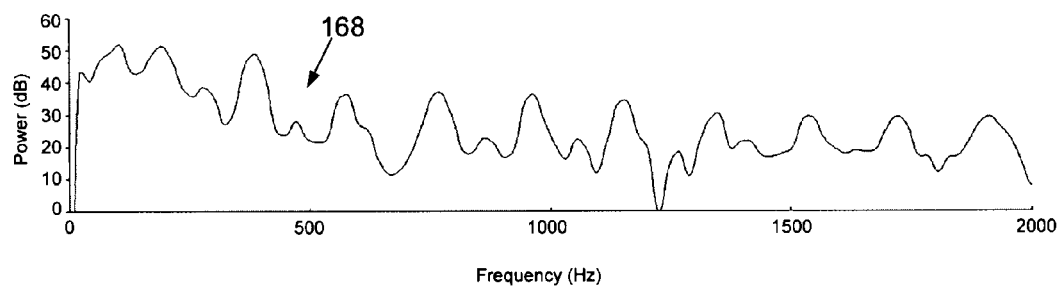
FIG. 7 is a power spectrum that represents the result of performing a Fast Fourier Transform on the frame of the time-series data waveform of FIG. 6.

Step 166 entails decomposing downsampled digital acoustic data signal 160 into frequency components by performing a Fast Fourier Transform (FFT) on successive, overlapping frames of acoustic time-series data. An FFT is a software implementation of a Discrete Fourier Transform that computes the power in frequency content of raw digital acoustic signal 152 to produce spectral frames. FIG. 7 shows a power spectrum 168 as the result of performing an FFT on the frame of time-series data waveform 164 of FIG. 6. The resulting power spectrum 168 exhibits a series of local intensity maxima at roughly 200 Hz, 400 Hz, 600 Hz, and so on. Power spectrum 168 is typical of an audio sample of a flying honeybee. The 200 Hz local intensity maximum corresponds to the wing rate of the bee, and the other local intensity maxima are harmonics of the 200 Hz wing rate. Step 170 entails assembling into a spectrogram data represented by multiple frames of power spectra 168.

Step 174 entails identifying a honeybee's acoustic signature, such as power spectrum 168, as a series of equally spaced lines on the spectrogram. A metric is used to indicate when an acoustic signature of a bee is present in a power spectrum 168. Based on observation, the wing rate of a bee is in the frequency range from 150 to 300 Hz. Additional harmonics of the wing frequency observed in the power spectrum result from the vibration mechanics of the wings of a bee. A preferred embodiment of a simple metric entails summing the power values at the candidate fundamental frequency with the power values at all of the candidate fundamental frequency harmonics. The underlying intent of this simple metric is to integrate into a single metric all of the acoustic power generated by the bee, not just the power observed at the frequency corresponding to beating wings. For example, if the candidate fundamental frequency is 175 Hz, the metric is established by summing the power values at 175 Hz, 350 Hz, 525 Hz, and so on up to the maximum frequency at which harmonics are observed. Typically six or seven harmonics suffice. Theoretically, harmonics could be observed up to the 11.025 KHz Nyquist frequency (given the 22.05 KHz sample rate), but for practical considerations the maximum harmonic frequency is limited to 2,000 Hz. A general equation expressing the summation of acoustic power over the harmonics is $$\text{Score}(f) = \sum_{i=1}^{i=nHarmonics} HarmonicScore(f_i),$$

where f is the fundamental frequency and i is the harmonic number. In one implementation of the preferred embodiment described, the score for a candidate fundamental frequency is the sum of binary decisions made about the presence of an individual harmonic frequency detected using a simple comparison operation with neighboring frequency bins. The score for an individual harmonic frequency is assigned a value of 1 or a value of 0 if its corresponding power value is, respectively, larger than or not larger than the power values of the adjacent frequency bins.

Figure 8:
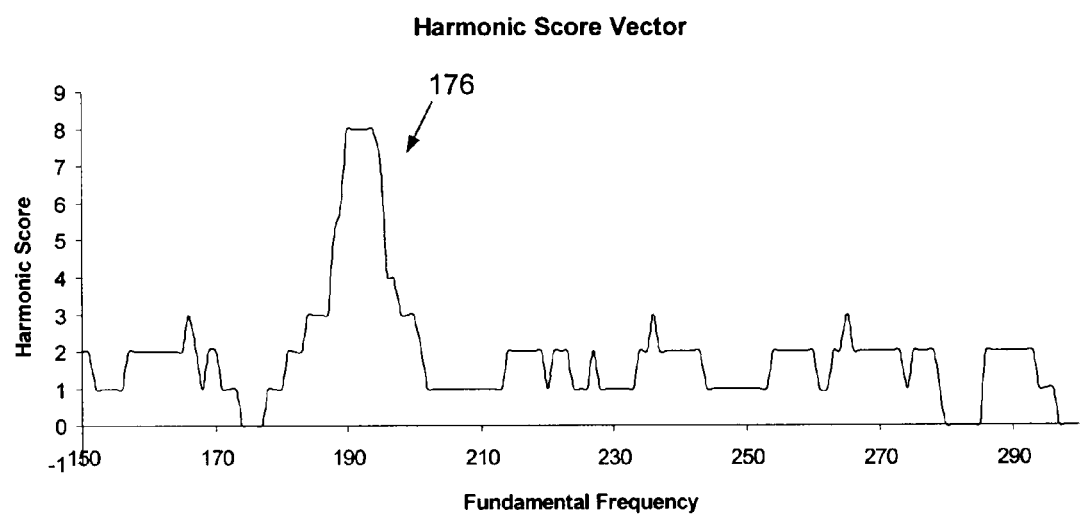
FIG. 8 is a harmonic score vector computed on the power spectrum of FIG. 7.

The data in each frame of power spectrum 168 spanning a 0-2,000 Hz band are compressed into a metric spanning the 150-300 Hz band, which includes the candidate frequencies for the bee to beat her wings. The previous scoring operation is effectively an algorithm for collapsing into a single value the power in a fundamental frequency and the power in its harmonics. In the example given above with reference to FIG. 7, the scores are computed every 1 Hz in the 150-300 Hz range, but they can be computed in whatever resolution is desired. FIG. 8 is a sample of a harmonic score vector 176.

Figure 9:
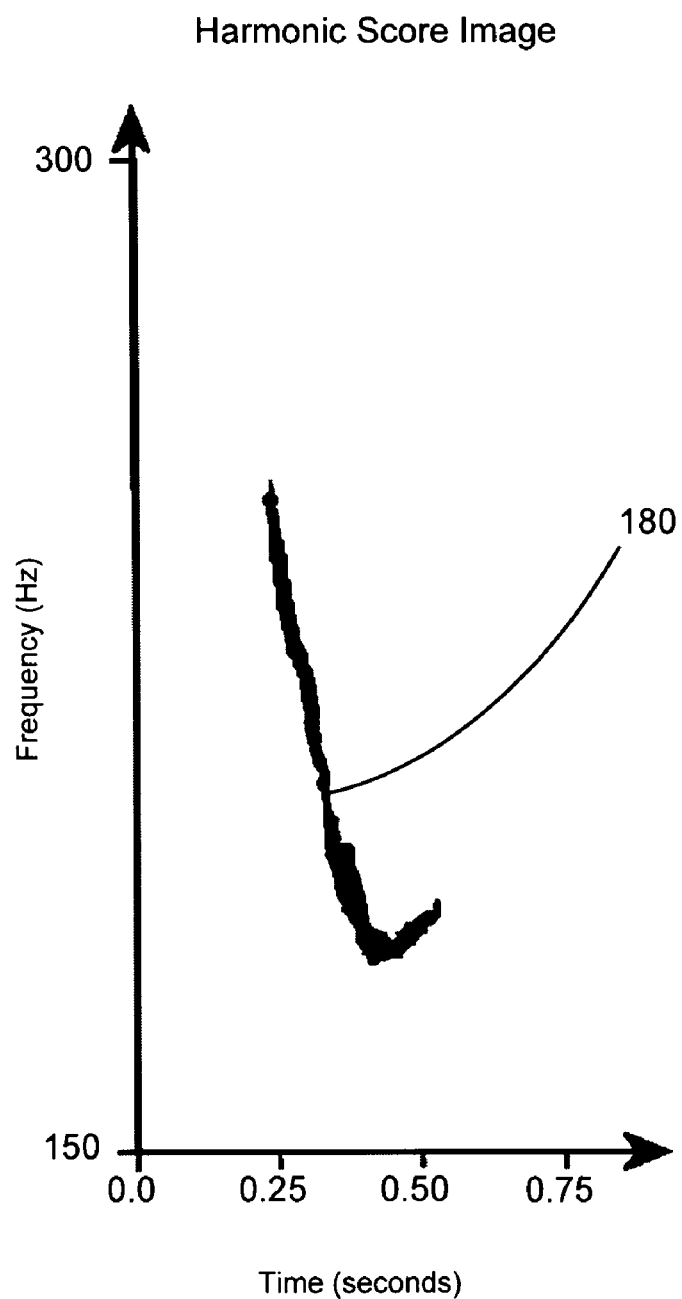
FIG. 9 is a harmonic score image formed from a series of harmonic score vectors of FIG. 8.

For each new data frame, processor 60 constructs a harmonic score vector over a search range of possible frequencies a bee will beat her wings. A wing-rate measurement step 178 entails determining over time the frequency changes that indicate when a bee launches from beehive 10. Although it changes in a somewhat complex fashion as the bee leaves beehive 10, the wing rate of a bee typically undergoes an approximately linear change of roughly 50 Hz over a 0.1 second interval. Entering each score vector into a matrix with columns corresponding to time enables looking for the linear feature that should result when a bee launches from beehive 10. FIG. 9 is a sample of a series of harmonic score vectors in image form and is called a harmonic score image 180.

Figure 10:
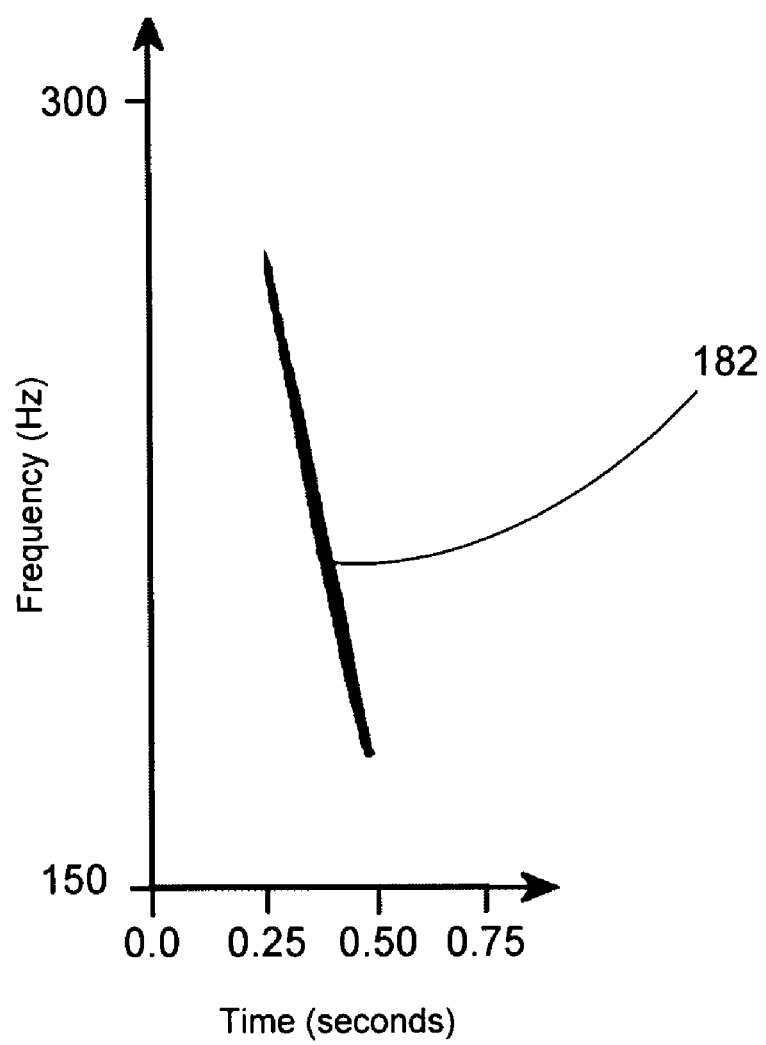
FIG. 10 is an image representing the result of performing match filtering on the harmonic score image of FIG. 9.

The negatively sloped line in harmonic score image 180 is the characteristic detected. The process described reduces the bee launch detection problem into one of identifying a line in an image. The process entails looking for the roughly 50 Hz change over a 0.1 second period, which corresponds to the change in the wing rate of the bee as she launches from beehive 10. There is a variety of techniques in the open literature for solving such problems, namely integration techniques such as the Hough Transform. In the current implementation, the process entails performing a matched filtering technique, in which a linear filtering operation enhances the line and is followed by a simple line integration operation. FIG. 10 shows an image 182 representing the output of this matched filtering technique. The maximum value of image 182 corresponds to the time and wing rate of a bee launching from beehive 10. A shift in the wing rate indicates a bee launching from entrance 20, and an absence in a shift in the wing rate indicates an idle or hovering bee flapping her wings.

Bee sortie data are useful to a farmer or beekeeper in a variety of applications. For example, in an embodiment of the method 140, a farmer or beekeeper uses the bee sortie data to track the health of beehive 10 by comparing current bee sortie data with an operational tolerance. The operational tolerance preferably includes a target range of pre-observed sorties at beehive 10 while it was known to be in a healthy condition, i.e., beehive 10 was known to contain a productive queen bee and was free from parasites. Alternatively, the operational tolerance includes an average range of pre-observed sorties from similarly populated beehives, inspected or assumed healthy. In either alternative, the operation tolerance includes a range of expected sorties to account for some normal variability in the sortie data because of weather conditions or seasonal variations. When compared to the operational tolerance, current bee sortie data demonstrating a declining number of sorties are evidence of a disease-afflicted beehive 10, while bee sortie data with stable or increasing numbers of foraging sorties is evidence of a healthy beehive 10. The farmer or beekeeper saves time by avoiding visually inspecting beehives that exhibit healthy bee sortie data.

In another embodiment of method 140, a beekeeper or farmer uses the bee sortie data to estimate the progress of pollination throughout a period of bloom of a crop. The farmer or beekeeper compares current bee sortie data with an operational tolerance that preferably includes a target range of pre-observed sorties at beehive 10 during a previous period of bloom of the crop. The operation tolerance accounts for some normal sortie data variability caused by the weather or season. Based on the number of sorties, the farmer or beekeeper knows roughly how many blossoms have been pollinated. When compared to the operational tolerance, the farmer or beekeeper will determine whether more beehives are necessary.

Finally, in another alternative embodiment of method 140, a farmer or beekeeper uses the sortie counts to generate a performance estimate of honey production and storage in beehive 10. The estimate is derived from a record, developed over time, of the numbers of flying bees launching from locations around entrance 20 of beehive 10. The number of flying bees launching serves as evidence of a number of nectar-carrying bees contributing to production of honey in beehive 10. In this embodiment, the farmer or beekeeper compares current bee sortie data with an operational tolerance that includes a target range of pre-observed sorties at beehive 10 and a corresponding amount of honey produced during a previous nectar flow. Alternatively, the operational tolerance includes an average of pre-observed sorties from similarly populated beehives and an average honey produced from those beehives during similar nectar flows. In either alternative, the operational tolerance accounts for some normal sortie data variability caused by weather or season. When compared to the operational tolerance, current bee sortie data demonstrating a smaller numbers of sorties correspond to smaller amounts of honey produced at beehive 10, and bee sortie data demonstrating larger numbers of sorties correspond to larger amounts of honey produced at beehive 10.

It will be obvious to those having skill in the art that many changes may be made to the details of the above-described embodiments without departing from the underlying principles of the invention. The scope of the present invention should, therefore, be determined only by the following claims.

The invention claimed is:

1. A method of assessing operational productivity of a beehive from which bees populating the beehive launch to forage for pollen and nectar, the beehive having an entrance from which flying bees launch at different times to forage, comprising:

positioning an acoustic pickup device at a location to pick up and provide an audio signal representing sounds produced by bees flying near the beehive entrance;

analyzing the audio signal to distinguish sounds representing flying bees launching from locations around the beehive entrance from ambient background noise and to provide indications of flying bee launches;

counting for each of multiple predetermined temporally spaced apart periods and in response to the flying bee launch indications a number of the flying bees launching from locations around the beehive entrance to produce bee sortie data; and processing the bee sortie data to determine whether over time the numbers of flying bees launching from locations around the beehive entrance during the predetermined periods fall outside of an operational tolerance and thereby provide an indication of the operational productivity of the beehive.

2. The method of claim 1, in which the acoustic pickup device includes a microphone.

3. The method of claim 1, in which the analyzing the audio signal to distinguish sounds representing flying bees launching includes detecting audio signal frequencies that indicate presence of a bee and detecting within the audio signal frequencies and over a short time interval a distinctive frequency shift from a higher frequency to a lower frequency.

4. The method of claim 3, in which the distinctive frequency shift from a higher frequency to a lower frequency is within a range of between about 260 Hz and about 180 Hz.

5. The method of claim 4, in which the short time interval is about 0.1 second.

6. The method of claim 1, in which the analyzing of the audio signal to distinguish sounds representing flying bees launching further comprises:

generating a frequency content representation of the audio signal to identify within the frequency content representation an acoustic signature associated with the flying bees, the acoustic signature including frequency harmonics of a fundamental frequency resulting from beating wings of the flying bees; and monitoring the fundamental frequency to detect in the fundamental frequency a frequency shift that corresponds to a flying bee launching from locations around the beehive entrance and an absence of a frequency shift that corresponds to a flying bee hovering around the beehive entrance.

7. The method of claim 6, in which the monitoring the fundamental frequency further comprises:

measuring at a first time, a first difference between a pair of adjacent frequency harmonics, the first difference corresponding to a first measured fundamental frequency;

measuring at a second time, a second difference between the pair of adjacent frequency harmonics, the second difference corresponding to a second measured fundamental frequency; and calculating a difference between the first and second measured fundamental frequencies to thereby detect in the fundamental frequency the frequency shift that corresponds to the flying bee launching from locations around the beehive entrance.

8. The method of claim 6, in which the fundamental frequency is in a range of between about 180 Hz and about 260 Hz.

9. The method of claim 1, in which the indication of the operational productivity includes a performance estimate of progress of pollination throughout a period of bloom of a crop, the estimate derived from the numbers of flying bees launching from locations around the beehive entrance as evidence of a number of pollinating bees contributing to pollinating the crop.

10. The method of claim 1, in which the indication of the operational productivity includes a performance estimate of honey production and storage in the beehive, the estimate generated derived from a record developed over time of the numbers of flying bees launching from locations around the beehive entrance as evidence of a number of nectar-carrying bees contributing to production of honey in the beehive.

11. The method of claim 1, in which the indication of the operational productivity includes a state of health estimate of the beehive, the estimate derived from a record developed over time of the numbers of flying bees launching from locations around the beehive entrance as evidence of an unhealthy beehive exhibiting over time declining numbers of flying bees launching and a healthy beehive exhibiting over time stable or increasing numbers of flying bees launching.

12. The method of claim 1, further comprising:

storing records of the operational productivity of the beehive; and communicating to a user viewing an LCD the records of the operational productivity of the beehive.

13. The method of claim 1, further comprising:

storing records of the operational productivity of the beehive; and communicating over a wireless communication link to a remote computer the records of the operational productivity of the beehive.

14. The method of claim 13, in which the wireless communications link is defined as one of IEEE 802.11, IEEE 802.15.1 or IEEE 802.15.4.

15. An acoustic sensor for detecting occurrences of bees launching to forage for pollen and nectar, comprising:

an acoustic pickup device configured to pick up and provide an audio signal representing sounds produced by bees flying near a location where the acoustic pickup device is placed;

a processor receiving data corresponding to the audio signal and performing analysis of the data to distinguish sounds representing flying bees launching; and the analysis including generating a frequency content representation of the audio signal to identify within the frequency content representation an acoustic signature associated with the flying bees, the acoustic signature including frequency harmonics of a fundamental frequency resulting from beating wings of the flying bees; and detecting in the fundamental frequency a frequency shift that corresponds to a flying bee launching.

16. The acoustic sensor of claim 15, further comprising:

memory sites for storing information corresponding to detected flying bee launches; and a wireless communication transmitter for communicating over a wireless communication link to a remote computer the information corresponding to detected flying bee launches.

17. The acoustic sensor of claim 15, further comprising:

memory sites for storing information corresponding to detected flying bee launches; and an LCD for visually displaying to an observer the information corresponding to detected flying bee launches.

18. The acoustic sensor of claim 15, in which the fundamental frequency is in a range of between about 180 Hz and about 260 Hz.

* * * * *